United States Patent [19]

Saito et al.

[11] Patent Number: 4,918,142
[45] Date of Patent: Apr. 17, 1990

[54] RUBBER COMPOSITION OF TIRE TREAD CONTAINING BLOCK COPOLYMER COUPLED WITH DICARBOXYLIC ACID ESTER

[75] Inventors: Yuichi Saito, Kobe; Takuzoh Yabuta, Minoo; Hiroyoshi Takao, Chiba; Akio Imai; Mitsuji Tsuji, both of Ichihara, all of Japan

[73] Assignees: Sumitomo Chemical Company, Limited, Osaka; Sumitomo Rubber Industries, Ltd., Kobe, both of Japan

[21] Appl. No.: 320,836

[22] Filed: Mar. 8, 1989

Related U.S. Application Data

[63] Continuation of Ser. No. 125,045, Nov. 25, 1987, abandoned.

[30] Foreign Application Priority Data

Nov. 29, 1986 [JP] Japan .................. 61-285578

[51] Int. Cl.$^4$ ............... C08F 297/04; C08L 53/02
[52] U.S. Cl. ........................... 525/99; 525/271; 525/314
[58] Field of Search ............. 525/314, 271, 99

[56] References Cited

U.S. PATENT DOCUMENTS

| | | | |
|---|---|---|---|
| 4,482,678 | 11/1984 | Furukawa | 525/236 |
| 4,523,618 | 6/1985 | Yamamoto et al. | 152/209 |
| 4,575,534 | 3/1986 | Oshima et al. | 525/314 |

FOREIGN PATENT DOCUMENTS

| | | |
|---|---|---|
| 0054440 | 6/1982 | European Pat. Off. ............ 525/314 |
| 57-100149 | 6/1982 | Japan . |
| 57-102912 | 6/1982 | Japan . |
| 57-108142 | 7/1982 | Japan . |
| 57-109817 | 7/1982 | Japan . |
| 57-109818 | 7/1982 | Japan . |
| 57-200439 | 12/1982 | Japan . |
| 58-93709 | 6/1983 | Japan . |
| 60-192739 | 10/1985 | Japan . |

OTHER PUBLICATIONS

Yoshida et al., Ser. No. 5400, filed 2/2/87.
Furukawa et al., Ser. No. 817949, filed 12/17/85.
Takao et al., Ser. No. 137856, filed 12/8/87.
Takao et al., Ser. No. 112989, filed 10/27/87.
Takao et al., Ser. No. 111336, filed 10/22/87.
Takao et al., Ser. No. 137859, filed 12/8/87.

*Primary Examiner*—Wilbert J. Briggs, Sr.
*Attorney, Agent, or Firm*—Armstrong, Nikaido, Marmelstein, Kubovcik & Murray

[57] ABSTRACT

A rubber composition suitable for tire treads having well-balanced excellent steering stability in cornering, wet skid characteristic, ice skid characteristic and rolling characteristic, and an excellent processability, which comprises a rubber component containing a block copolymer consisting essentially of a block A and a block B, obtained by conducting polymerization of an aromatic vinyl compound and a conjugated diene compound in a hydrocarbon solvent in the presence of an organolithium initiator and modifying with a coupling agent, and satisfying the following conditions (A) to (E);

(A) the block A having a content of an aromatic vinyl compound of 5 to 29% by weight and a content of 1,2-bonds in the conjugated diene component of 25 to 55% by weight, (B) the block B having a content of an aromatic vinyl compound of 35 to 60% by weight and a content of 1,2-bonds in the conjugated diene component of 20 to 70% by weight, (C) the content of the block A in the block copolymer being from 20 to 80% by weight, (D) the average content of the aromatic vinyl compound in the block copolymer being from 20 to 40% by weight and the average content of 1,2-bonds in the conjugated diene component of the block copolymer being from 20 to 60% by weight, and (E) at least 40% by weight of the polymer chains of the block copolymer being a branched polymer formed by modification with a trifunctional or tetrafunctional coupling agent.

5 Claims, No Drawings

RUBBER COMPOSITION OF TIRE TREAD CONTAINING BLOCK COPOLYMER COUPLED WITH DICARBOXYLIC ACID ESTER

This application is a continuation of application Ser. No. 125,045 filed Nov. 25, 1987, now abandoned.

BACKGROUND OF THE INVENTION

The present invention relates to a rubber composition suitable for use in treads of automobile tires, and more particularly to a rubber composition for use in treads of tires superior in steering stability in cornering, wet skid characteristic, and skid characteristic on ice-snow road (hereinafter referred to as "ice skid characteristic").

The characteristics required for tires are principally wear resistance, wet skid characteristic, low heat generation, bending resistance, chipping resistance and groove cracking resistance, and they must be well balanced. Especially, from the viewpoint of resources and energy saving, it is important that energy loss and rolling resistance are low.

Among these characteristics, a high wet skid characteristic for steering stability and a low rolling resistance for fuel saving are particularly important, but the both characteristics have been recognized as contrary to each other from the conventional knowledge.

The present inventors, while continuing the fundamental study of the rolling and wet skid characteristics which have been hitherto considered as antinomic, made a study of the structure and polymerization process of polymers having an excellent processability practically required in tire manufacturing such as kneading processability, roll processability and extrusion processability, and they found, as described in U.S. Pat. No. 4,523,618, that a branched polymer having a particular structure has a high wet skid characteristic and an excellent rolling resistance together with an excellent processability.

Also, rubber compositions suitable for use in the treads of low fuel cost tires are similarly proposed by the present inventors, for instance, in Japanese Unexamined Patent Publication Nos. 4633/1984 and 4634/1984 and U.S. Pat. No. 4,482,678. These compositions contain as a main rubber component a copolymer of a vinyl aromatic compound and butadiene having a particular structure and a particular molecular weight distribution, and they have both a high wet skid characteristic and an excellent rolling resistance characteristic and further excellent processability and excellent practical moldability required in molding of tires.

Also, in recent years, since the public nuisance of dust particles due to the spike tires in a cold district is highlighted and since exchanging summer tires with snow or spike tires is awkward, tires available throughout the year without exchanging is strongly demanded.

A tread rubber used in these tires requires an excellent ice skid characteristic and an excellent steering stability in cornering on dry and wet roads in addition to a high wet skid characteristic and a low rolling resistance. The superiority or inferiority in steering stability at the time of cornering is decided in the case where a driver enters a corner at a speed higher than the safe running speed for cornering. A tire having an excellent steering stability has, for instance, a performance capable of sufficiently controlling the running line or the attitude of automobile even in the case of exceeding the grip limit of the tire. Accordingly, there is no danger such as accident and the safety is assured. on the other hand, in case of a tire which is inferior in the steering stability, a stable running is possible within the grip limit of the tire, but when the speed exceeds a certain level, the grip force suddenly drops and the automobile causes spin or break away which leads to an accident and accordingly is dangerous. In order to improve the skid characteristic on ice-snow road, it is known hitherto that a rubber hardness at a low temperature must be reduced, but the reduction in hardness brings about lowering of the steering stability. It is difficult to satisfy these characteristics at the same time.

For instance, in a rubber composition mainly composed of an emulsion-polymerized SBR, a good wet skid characteristic may be obtained, but an energy loss is high and a rolling resistance characteristic is poor, besides an ice skid characteristic is also not sufficient.

Also, a rubber composition using rubber components having a low glass transition temperature (Tg) such as natural rubber, polyisoprene rubber, high-cis-1,4-polybutadiene rubber and the like, has superior rolling resistance characteristic and ice skid characteristic, but is poor in wet skid characteristic.

Further, though the compositions of the aforementioned Japanese Unexamined Patent Publication Nos. 4633/1984 and 4634/1984, U.S. Pat. Nos. 4,523,618 and 4,482,678 have a high wet skid characteristic together with an excellent rolling resistance characteristic, the rubber hardness increases rapidly at a low temperature due to its relatively high Tg, thus the ice skid characteristic is far from the satisfied level.

Various rubber compositions are also proposed by other persons. For instance, in Japanese Unexamined Patent Publication Nos. 102912/1982 and 108142/1982, there are disclosed rubber compositions containing a rubber which is a styrene-butadiene copolymer prepared using an organolithium initiator and having two blocks with different bound styrene contents and vinyl contents in butadiene component. The copolymers disclosed in these publications are linear polymers. The compositions have well-balanced wet skid characteristic and rolling resistance characteristic, but the ice skid characteristic is not in a satisfactory level.

In Japanese Unexamined Patent Publication Nos. 165445/1982, 200439/1982 and 192739/1985, a rubber composition containing a branched styrene-butadiene block copolymer having two different blocks is disclosed. A relatively good ice skid characteristic is achieved, but a level required in practical use is still not satisfied.

Also, though it has been attempted to blend different kinds of polymers together so as to possibly harmonize the aforementioned characteristics which are conflicting with each other, it is the present situation that the demanded performance is not still satisfied and further improvements are strongly demanded in the industry, setting aside some improvements being made to a certain extent.

In view of the present situation, the present invention is intended to improve drawbacks of conventional rubber compositions for use in the tread of tires, in which a satisfactory level is not achieved in the ice skid characteristic and the steering stability in cornering.

Accordingly, it is an object of the present invention to provide a rubber composition suitable for use in the tread of tires, in which wet skid characteristic, rolling resistance characteristic, ice skid characteristic and steering stability in cornering are totally improved.

The above and other objects of the present invention will become apparent from the description hereinafter.

SUMMARY OF THE INVENTION

The present inventors have studied in order to further improve wet skid characteristic, rolling resistance characteristic, ice skid characteristic and cornering characteristic with respect to a copolymer of an aromatic vinyl compound and a conjugated diene compound prepared by using an organolithium initiator in a hydrocarbon solvent, and have now found that these characteristics can be improved totally and moreover an excellent processability is obtained, when a branched block copolymer which consists of two blocks having specific contents of an aromatic vinyl compound and specific contents of 1,2-vinyl bonds in the conjugated diene portions and in which more than predetermined proportion of the polymer chains are modified with a specific coupling agent, is used as the rubber component of rubber compositions.

In accordance with the present invention, there is provided a rubber composition comprising a rubber component containing a block copolymer, said block copolymer being a branched block copolymer consisting essentially of a block A and a block B, obtained by copolymerization of an aromatic vinyl compound and a conjugated diene compound in the presence of an organolithium initiator in a hydrocarbon solvent and having the following conditions (A) to (E);

(A) the block A is a block of a copolymer wherein the content of the aromatic vinyl compound is from 5 to 20% by weight and the content of 1,2-bonds in the conjugated diene component is from 25 to 55% by weight, (B) the block B is a block of a copolymer wherein the content of the aromatic vinyl compound is from 35 to 60% by weight and the content of 1,2-bonds in the conjugated diene component is from 20 to 70% by weight;

(C) the content of block A is from 20 to 80% by weight;

(D) the average content of the aromatic vinyl compound is from 20 to 40% by weight and the average content of 1,2-bonds in the conjugated diene component is from 20 to 60% by weight; and (E) at least 40% by weight of the whole polymer chains are modified with a trifunctional or tetrafunctional coupling agent.

The rubber composition of the present invention, as compared with the rubber compositions disclosed in Japanese Unexamined Patent Publication Nos. 102912/1982, 108142/1982, 165445/1982, 200439/1982 and 192739/1985, is different in limited conditions in the structure of block copolymer or the modifier used. Consequently, it is superior in a total balance between steering stability in cornering, wet skid characteristic, low temperature characteristic and rolling resistance characteristic.

These excellent characteristics in the present invention are achieved by the use of the block copolymer having the specific structure such that two blocks A and B have different contents of the aromatic vinyl compound, namely from 5 to 20% by weight in block A and from 35 to 60% by weight in block B, and at least 40% by weight of the polymer chains are modified with a trifunctional or tetrafunctional coupling agent.

DETAILED DESCRIPTION

In the block copolymer of the present invention, it is important that (A) the content of the aromatic vinyl compound in the block A is form 5 to 20% by weight and the content of 1,2-bonds in the conjugated diene component in the block A is from 25 to 55% by weight, and (B) the content of the aromatic vinyl compound in the block B is from 35 to 60% by weight and the content of 1,2-bonds in the conjugated diene component is from 20 to 70% by weight.

When the content of the aromatic vinyl compound in the block A is less than 5% by weight, the wet skid characteristic is poor, and when the content is more than 20%, the steering stability in cornering and the traveling performance at low temperatures are poor. Preferebly, the content of the aromatic vinyl compound in the block A is from 10 to 20% by weight.

Also, when the content of the aromatic vinyl compound in the block B is less than 35% by weight, the wet skid characteristic and the steering stability are poor, and when the content is more than 60% by weight, the traveling performance at low temperatures is poor.

Preferably, the content of the aromatic vinyl compound in the block B is from 40 to 60% by weight.

Also, when the content of the aromatic vinyl compound in the block B is at least 2 times the average content of the aromatic vinyl compound in the block copolymer, the steering stability is further improved.

In each of the blocks A and B, the 1,2-bond content in the conjugated diene component is at least 10% by weight. It is industrially difficult to decrease the 1,2-bond content to below 10% by weight. Preferably, the 1,2-bond content in the block A is from 25 to 55% by weight, and the 1,2-bond content in the block B is from 20 to 70% by weight.

In the block copolymer of the present invention, the content of block A is from 20 to 80% by weight, preferably from 40 to 80% by weight. Characteristics intended by the present invention are not obtained outside this range.

In the block copolymer of the present invention, the average content of the aromtic vinyl compound in the block copolymer as a whole is from 20 to 40% by weight. If the average aromatic vinyl compound content in the block copolymer is less than 20% by weight, the wet skid characteristic is poor, and if it exceeds 40% by weight, the rolling resistance characteristic and the traveling characteristic at low temperatures are lowered.

Also, the average content of 1,2-bonds in the conjugated diene component of the copolymer as a whole is from 20 to 60% by wight, preferably from 25 to 50% by weight. Deviation from this range deteriorates the balance between the wet skid characteristic and the rolling resistance characteristic.

Further, it is essential that the block copolymer used in the present invention is a branched polymer in which at least 40% by weight of the whole polymer chains are those modified with a trifunctional or tetrafunctional coupling agent.

Known coupling agents can be used in the present invention, e.g. compounds having 3 to 4 halogen atoms such as silicon tetrachloride, tin tetrachloride and trichlorobenzene, and compounds having two ester bonds in the molecule such as dicarboxylic acid diesters. The coupling agent may be used alone or in admixture thereof. The dicarboxylic acid diesters are preferred. Representative examples of the dicarboxylic acid diester are, for instance, dimethyl adipate, diethyl adipate, di-n-butyl adipate, dimethyl maleate, diethyl maleate, di-n-buthyl maleate and di-n-dioctyl maleate. The diesters may be used alone or in admixture thereof.

It is also important that the content of the modified polymer chains in the whole polymer chains is at least 40% by weight. When the content is less than 40% by weight, the roll processability in kneading of compounded rubber is poor, and also a balance between the ice skid characteristic and the wet skid characteristic becomes bad.

The content of the polymer chains modified by the coupling agent can be controlled by the ratio of the amounts of the living polymer ends and the coupling agent. The content can be determined from the molecular weight distribution of the block copolymer measured by a gel permeation chromatograph (GPC). That is to say, the weight ratio of the modified polymer chains and the unmodified polymer chains can be defined by the relative ratio of the heights of the peaks corresponding to the respective average molecular weights of the modified and unmodified polymer chains.

The block copolymer of the present invention is prepared, for instance, by a process using an organic alkali metal compound as an initiator known as a living anionic polymerization. Particularly, the process using an organolithium compound as a polymerization initiator, a Lewis basic compound such as ethers or tertiary amines as an agent for controlling the microstructure, namely 1,2-bond content in the conjugated diene portion, and an inert hydrocarbon compound as a polymerization solvent, is preferred from the viewpoint of polymerization stability and controllability.

The block copolymer of the present invention can be prepared, for instance, in such a manner as after first polymerization of the block A or B, changing the polymerization temperature or adjusting the amount of the microstructure control agent and then conducting a polymerization for the other block.

Examples of the aromatic vinyl compound employed for preparing the block copolymer of the present invention are, for instance, styrene, styrene derivatives having a substituent on the benzene nucleus, e.g. m-methylstyrene, p-methylstyrene and p-tertiary-butylstyrene, and styrene derivatives having a substituent on the vinyl group, e.g. α-methylstyrene. The aromatic vinyl compounds may be used alone or in admixture thereof. From the viewpoint of obtainability, styrene and p-methylstyrne are preferably selected, and more preferably, styrene is selected.

Examples of the conjugated diene compound are, for instance, 1,3-butadiene, isoprene, piperylene and substituted butadienes such as 2,3-dimethyl-1,3-butadiene and 1-phenyl-1,3-butadiene, 1,3-pentadiene and its substituted derivatives, and the like. The diene compounds may be used alone or in admixture thereof. Particularly, 1,3-butadiene or isoprene is preferably employed, because of easiness in obtaining the monomer and high polymerization rate in the production on an industrial scale.

In the preparation of the block copolymer of the present invention, aromatic hydrocarbons such as benzene, toluene, xylene and ethylbenzene, aliphatic hydrocarbons such as hexane and heptane, and alicyclic hydrocarbons such as cyclopentane, cyclohexane and methylcyclohexane are preferably employed as an inert polymerization solvent or diluent from the viewpoint of control of the polymerization reaction. These hydrocarbons may be employed alone or in admixture thereof. They are preferably used in an amount of 100 to 2000 parts by weight per 100 parts by weight of the whole monomers used.

With regards to these solvents and the abovementioned monomers, it is necessary to previously, sufficiently remove therefrom substances which destroy the initiator or the active ends, e.g. water, oxygen, carbon dioxide, certain kinds of sulfur compounds, and acetylene compounds.

Preferable organolithium compounds used for preparing the block copolymer in the present invention are those known usually as anionic polymerization initiators of one end initiation type or both ends initiation type. Representative examples are, for instance, ethyllithium, propyllithium, butyllithium, amyllithium, trimethylenedilithium, tetramethylenedilithium, hexyllithium, cyclohexyllithium, phenyllithium, tolyllithium, naphthyllithium, lithium complexes of condensed or noncondensed aromatic rings, oligobutadienyldilithium and oligoisobutylenyldilithium which are in the living state, and the like. These organolithium compounds may be employed alone or in admixture thereof.

As Lewis basic compounds used for the preparation of the block copolymer of the present invention, various kinds of compounds can be employed, but ether compounds and tertiary amines are particularly preferred because of being easily obtainable in the industrial scale. Examples of the ether compounds are, for instance, cyclic ethers such as tetrahydrofuran, tetrahydropyran and 1,4-dioxane; aliphatic monoethers such as diethyl ether and dibutyl ether; aliphalic polyethers such as ethyleneglycoldimethyl ether, ethyleneglycoldiethyl ether, ethyleneglycoldibutyl ether, diethyleneglycoldiethyl ether and diethyleneglycoldibutyl ether; aromatic ethers such as diphenyl ether and anisole, and the like. Examples of the tertiary amine compounds are, for instance, triethylamine, tripropylamine, tributylamine, and other compounds such as N,N,N',N'-tetramethylethylenediamine, N,N-diethylaniline, pyridine and quinoline, and the like, The content of 1,2-bonds in the block copolymer can be controlled by adjusting the ratio of the Lewis basic compound and the polymerization initiator, and the polymerization temperature. The content of 1,2-bonds is increased with increasing the proportion of the Lewis basic compound and with lowering the polymerization temperature.

The polymerization temperature is preferably from 0° to 150° C. from the viewpoint of the economy and side reaction, though it can be changed according to the microstructure desired.

In the present invention, the molar ratio of the coupling agent to the living polymer end should be controlled in order to obtain the block copolymer containing the modified polymer chains in the desired proportion. Usually, the coupling agent is used in an amount of at least 0.1 mole per mole of the living polymer ends.

It is preferable that the Mooney viscosity at 100° C. ($ML_{1+4}$, 100° C.) of the block copolymer of the present invention is from 20 to 150. When the Mooney viscosity is less than 20, the rolling resistance increases, and when more than 150, the processability is poor.

The block copolymer can be used alone as the rubber component or in the form of a blend with other rubbers.

The rubber component used in the rubber composition in accordance with the present invention must contain at least 30% by weight of the above-mentioned block copolymer. When the content of the block copolymer in the rubber component is less than 30% by weight, the wet skid resistance characteristic and the skid resistance characteristic at low temperatures are poor. Preferably, the content in the rubber component is from 40% to less than 90% by weight.

Although polymers which may be blended as the rubber component with the block copolymer are preferably natural rubber, synthetic isoprene rubber and high cis-butadiene rubber, an emulsion-polymerized SBR (e.g., an SBR having a styrene content of 23.57% by weight and a vinyl content of 18.7% by weight) can be also employed. The content of these polymers in the rubber component is at most 70% by weight, preferably from 10 to less than 60% by weight. It is not preferable to use beyond 70% by weight, because in case of natural rubber, synthetic polyisoprene rubber and high cis-butadiene rubber, the wet skid characteristic lowers, and in case of an emulsion SBR, the skid characterristic at low temperatures, particularly on ice-snow road lowers. On the other hand, it is preferable to use these polymers in an amount of not less than 10% by weight, because the tackiness is increased and the inconvenient phenomenon such as demold splitting can be avoided in molding the composition into tires.

The rubber composition in accordance with the present invention shows an excellent wet skid characteristic, an excellent low temperature characteristic and a low rolling resistance as a result of using the block copolymer as mentioned above. In order to exhibit these characteristics and also to maintain a breaking resistance as obtained in a conventional composition for tires, the composition of the present invention may be incorporated with, as process oil, an oil having a flow point of 0° to less than 30° C.

As such an oil, an oil having a high aromatic compound content, namely a so-called aromatic oil, is preferably used. It is not preferable to use an oil having a flow point above 30° C., because the skid characteristic at low temperatures lowers, and also the viscosity of the composition increases, thus resulting in poor operability in handling. The rubbers used in the present invention may be in the form of oil extended rubber containing an aromatic oil, a mineral oil or a naphthenic oil.

The rubber composition of the present invention may contain usual other rubber additives, e.g. carbon black, wax, age registor, curing agent, curing assistant and curing accelerator.

The composition of the present invention can be cured in a usual manner usually at a temperature of 140° to 190° C.

The present invention is more specifically described and explained by means of the following Examples in which all percents and parts are by weight unless otherwise noted. It is to be understood that the present invention is not limited to the Examples, and various changes and modification may be made in the invention without departing from the spirit and scope thereof.

EXAMPLES 1 TO 9 And COMPARATIVE EXAMPLES 1 TO 9

Synthesis of Polymers A to F (Examples) and Polymers H to K (Comparative Examples)

The air in a 20 liter autoclave equipped with a stirrer and a jacket was replaced with nitrogen gas, and the autoclave was charged with 10 kg of purified and dried n-hexane (or cyclohexane) and prescribed amounts of styrene, butadiene and tetrahydrofuran as a microstructure modifier. As a polymerization initiator, n-butyllithium dissolved in n-hexane was then added, and hot water was circulated in the jacket of the autoclave to start the polymerization at the prescribed temperature for producing the block A of the block copolymer as shown in Table 1.

After attaining the polymerization conversion of not less than 99%, prescribed amounts of styrene, butadiene and a microstructure modifier were further fed to the autoclave, and the polymerization was further continued at the prescribed temperature to form the block B of the block copolymer as shown in Table 1.

After the completion of the polymerization, a prescribed amount of the coupling agent shown in Table 1 was added to the autoclave and the reaction was conducted for 30 minutes.

After adding 2,6-di-tertial-butyl-p-cresol (Sumilizer ®-BHT made by Sumitomo Chemical Co., Ltd.) to the final reaction mixture in an amount of 1.0 part per 100 parts of the copolymer, the reaction mixture was poured into hot water and the solvent was distilled away. The precipitated polymer was dried under reduced pressure. The properties of the polymer were measured and the results are shown in Table 1. The measurement was made under the following conditions.

(1) Styrene content and 1,2-bond content in conjugated diene component

These contents were calculated from the ratio of the intensities of characteristic absorptions measured using an infrared spectrophotometer made by Japan Spectroscopic Co., Ltd.

(2) Branched polymer content

A gel permeation chromatograph HLC-802UR made by Toyo Soda Co., Ltd. was used and columns of $10^3$, $10^4$, $10^6$ and $10^7$ were selected as the distribution column. A refractometer was used as a detector. The molecular weight distribution of a polymer was measured at 40° C. by using tetrahydrofuran (THF) as a developing solvent. The relative ratio of the hights of the peaks corresponding to the average molecular weights of the branched and unbranched polymers is defined as the weight ratio of the respective polymers.

Polymer G (Comparative Example) shown in Table 1 is a random copolymer having a uniform composition, and also polymers L to N (Comparative Examples) are emulsion-polymerized styrene-butadiene rubbers (emulsion SBR).

The polymers A to N shown in Table 1 were used for the preparation of urbber compositions

TABLE 1

|  | Polymer | | | | |
| --- | --- | --- | --- | --- | --- |
|  | A Example | B Example | C Example | D Example | E Example |
| Polymerization Conditions | | | | | |
| Solvent (kg) | n-Hexane | n-Hexane | Cyclohexane | Cyclohexane | n-Hexane |

TABLE 1-continued

|  | | | | | |
|---|---|---|---|---|---|
|  | 10 | 10 | 10 | 10 | 10 |
| A Block | | | | | |
| Butadiene (kg) | 0.85 | 0.86 | 0.43 | 1.27 | 1.27 |
| Styrene (kg) | 0.15 | 0.14 | 0.07 | 0.23 | 0.23 |
| Microstructure modifier (g) | THF[*1] 43.0 | THF 11.9 | THF 37.8 | THF 43.2 | THF 43.2 |
| n-BuLi[*2] (mmol) | 13.3 | 12.9 | 13.1 | 11.8 | 12.5 |
| B Block | | | | | |
| Butadiene (kg) | 0.55 | 0.55 | 0.82 | 0.27 | 0.27 |
| Styrene (kg) | 0.45 | 0.45 | 0.68 | 0.23 | 0.23 |
| Microstructure modifier (g) | EGDEE[*3] 3.9 | Diglyme[*4] 0.7 | EGDEE 4.2 | EGDBE[*5] 4.0 | EGDEE 3.5 |
| Polymerization temp. (max.) | | | | | |
| Synthesis of A block | 60° C. | 60° C. | 57° C. | 53° C. | 55° C. |
| Synthesis of B block | 57° C. | 60° C. | 57° C. | 60° C. | 57° C. |
| Kinds of coupling agent | SiCl$_4$ | SiCl$_4$ | SiCl$_4$ | SiCl$_4$ | SiCl$_4$ |
| Amount of coupling agent (mmol) | 1.6 | 1.5 | 1.6 | 1.7 | 1.6 |

|  | Polymer | | | | |
|---|---|---|---|---|---|
|  | F Example | G Comparative Example | H Comparative Example | I Comparative Example | J Comparative Example |
| Polymerization Conditions | | | | | |
| Solvent (kg) | Cyclohexane 10 | Cyclohexane 10 | n-Hexane 10 | Cyclohexane 10 | n-Hexane 10 |
| A Block | | | | | |
| Butadiene (kg) | 1.27 | 1.4 | 1.0 | 1.34 | 1.5 |
| Styrene (kg) | 0.23 | 0.6 | 0 | 0 | 0 |
| Microstructure modifier (g) | THF 43.2 | THF 27.0 | THF 18.0 | THF 18.4 | THF 18.4 |
| n-BuLi[*2] (mmol) | 10.8 | 14.3 | 12.8 | 13.0 | 13.3 |
| B Block | | | | | |
| Butadiene (kg) | 0.27 | — | 0.6 | 0.39 | 0.29 |
| Styrene (kg) | 0.23 | — | 0.4 | 0.27 | 0.21 |
| Microstructure modifier (g) | Diglyme 3.3 | — | EGDBE 2.0 | EGDEE 1.5 | Diglyme 1.7 |
| Polymerization temp. (max.) | | | | | |
| Synthesis of A block | 55° C. | 60° C. | 60° C. | 60° C. | 60° C. |
| Synthesis of B block | 58° C. | — | 58° C. | 60° C. | 63° C. |
| Kinds of coupling agent | DEAP[*6] | SiCl$_4$ | SiCl$_4$ | SiCl$_4$ | SiCl$_4$ |
| Amount of coupling agent (mmol) | 2.1 | 1.9 | 1.8 | 1.9 | 1.9 |

|  | Polymer | | | |
|---|---|---|---|---|
|  | K Comparative Example | L Comparative Example | M Comparative Example | N Comparative Example |
| Polymerization Conditions |  | Emulsion SBR | Emulsion SBR | Emulsion SBR |
| Solvent (kg) | Cyclohexane 10 | | | |
| A Block | | | | |
| Butadiene (kg) | 1.34 | | | |
| Styrene (kg) | 0 | | | |
| Microstructure modifier (g) | THF 9.7 | | | |
| n-BuLi[*2] (mmol) | 12.9 | | | |
| B Block | | | | |
| Butadiene (kg) | 0.4 | | | |
| Styrene (kg) | 0.26 | | | |
| Microstructure modifier (g) | EGDEE 1.0 | | | |
| Polymerization temp. (max.) | | | | |
| Synthesis of A block | 60° C. | | | |
| Synthesis of B block | 60° C. | | | |
| Kinds of coupling agent | SiCl$_4$ | | | |
| Amount of coupling agent (mmol) | 1.8 | | | |

|  | Polymer | | | | | |
|---|---|---|---|---|---|---|
|  | A Example | B Example | C Example | D Example | E Example | F Example |
| Polymer Structure | | | | | | |
| Results of Analysis | | | | | | |
| A Block | | | | | | |
| Styrene cont. (%) | 14.9 | 13.7 | 12.8 | 14.9 | 15.4 | 15.0 |

TABLE 1-continued

| | | | | | | |
|---|---|---|---|---|---|---|
| 1,2-bond cont. (%) | 39.7 | 29.4 | 39.9 | 41.3 | 41.1 | 41.2 |
| B Block | | | | | | |
| Styrene cont. (%) | 44.8 | 45.1 | 44.8 | 46.1 | 46.2 | 46.3 |
| 1,2-bond cont. (%) | 37.1 | 30.8 | 41.2 | 40.5 | 39.9 | 40.3 |
| A/B ratio | 50/50 | 50/50 | 25/75 | 75/25 | 75/25 | 75/25 |
| Whole copolymer | | | | | | |
| Styrene cont. (%) | 29.9 | 29.4 | 36.8 | 22.7 | 23.1 | 22.9 |
| 1,2-bond cont. (%) | 38.4 | 30.1 | 40.9 | 41.1 | 40.8 | 41.0 |
| Branched polymer content (%) | 61 | 63 | 63 | 60 | 60 | 60 |
| $ML_{1+4}$, 100° C. | 77 | 77 | 76 | 75 | 45 | 45 |
| Amount of oil (phr) | — | — | — | — | 37.5 | 37.5 |

| | Polymer | | | | | | | |
|---|---|---|---|---|---|---|---|---|
| | G Com. Ex. | H Com. Ex. | I Com. Ex. | J Com. Ex. | K Com. Ex. | L Com. Ex. | M Com. Ex. | N Com. Ex. |
| Polymer Structure Results of Analysis | | | | | | | | |
| A Block | | | | | | | | |
| Styrene cont. (%) | — | 0 | 0 | 0 | 0 | — | — | — |
| 1,2-bond cont. (%) | — | 35.1 | 36.0 | 35.8 | 30.1 | — | — | — |
| B Block | | | | | | | | |
| Styrene cont. (%) | — | 39.1 | 40.6 | 41.2 | 39.2 | — | — | — |
| 1,2-bond cont. (%) | — | 35.4 | 34.6 | 35.0 | 32.3 | — | — | — |
| A/B ratio | — | 50/50 | 67/33 | 75/25 | 67/33 | — | — | — |
| Whole copolymer | | | | | | | | |
| Styrene cont. (%) | 30.1 | 19.5 | 13.5 | 10.3 | 13.1 | 23.6 | 23.5 | 35.0 |
| 1,2-bond cont. (%) | 30.2 | 35.2 | 35.5 | 35.6 | 30.8 | 18.7 | 19.0 | 19.0 |
| Branched polymer cont. (%) | 60 | 63 | 60 | 60 | 60 | — | — | — |
| $ML_{1+4}$, 100° C. | 77 | 76 | 75 | 74 | 74 | 52 | 55 | 50 |
| Amount of oil (phr) | — | — | — | — | — | — | 37.5 | 37.5 |

Notes
*[1]THF: tetrahydrofuran
*[2]n-BuLi: n-butyllithium
*[3]EGDEE: ethyleneglycol diethyl ether
*[4]Diglyme: diethyleneglycol dimethyl ether
*[5]EGDBE: ethyleneglycol dibutyl ether
*[6]DMAP: dimethyl adipate

PREPARATION AND CURING OF RUBBER COMPOSITIONS

By using the polymers shown in Table 1 and according to the recipes shown in Table 2, kneading was conducted and a steel radial tire having a size of 205/60R15 was prepared from each of the compounded rubbers according to a usual procedure for the production of tires through extrusion into a tread, molding and curing.

The tires were attached to rims of 6JJ×15 inches and then to a car. The car was run for testing the steering stability, the wet skid resistance, and the braking and starting characteristics on snow road. With respect to the rolling characteristis, a drum test was made.

The testing methods are shown below. Also, the test results are shown in Table 3.

(1) Steering stability

The above-mentioned tires were attached to a 2000 cc passenger car. The turning test was made on a dry flat asphalt road with one passenger. The steering stability was evaluated totally by a 5 point method with respect to speed at the time of turning, nonslipping maximum speed, controllability, etc.

(2) Wet skid resistance characteristic

The above-mentioned tires were attached to a 2000 cc passenger car. The car was run on a slippery concrete road sprinkled with water at a speed of 60 km/hour with one passenger. The friction coefficient $\mu$ was calculated from the stopping distance. It is shown as an index to the value of Comparative Example 1. The larger the value, the better the wet skid resistance characteristic.

(3) Running performance on snow road

Running performance at $-5°$ C. on a road covered with snow trodden hard was evaluated by a 5 point method. The larger the value, the better the running performance.

(4) Rolling resistance characteristic

The tire was attached to a rim of 5½J×13, rolling resistance was measured by causing the tire to run on a 60 inch drum under conditions of 80 km/hour in speed, 2.10 kgf/cm² in inner pressure and 300 kg in load. The rolling resistance is shown in the table as an index to the value of Comparative Example 1. The smaller the value, the better the rolling resistance characteristic.

TABLE 2

| Recipe No. (weight parts) | 1 | 2 | 3 | 4 | 5 |
|---|---|---|---|---|---|
| Polymer | 100 | 137.5 | 137.5 | 75 | 89.4 |
| Additional rubber | — | — | — | 25*[3] | 35*[4] |
| Carbon block ISAF | 90 | 90 | 90 | 70 | 85 |
| Aromatic oil | 50 | 12.5 | 50 | 25 | 20 |
| Wax | 2 | 2 | 2 | 2 | 2 |
| Antioxidant*[1] | 2 | 2 | 2 | 2 | 2 |
| Stearic acid | 1 | 1 | 1 | 1 | 1 |
| Zinc oxide | 3 | 3 | 3 | 3 | 3 |
| Sulfer | 1.75 | 1.75 | 1.75 | 1.85 | 2.15 |
| Curing accelerator*[2] | 1 | 1 | 1 | 1 | 1.25 |

(Notes)
*[1] N-(1,3-dimethylbutyl)-N-phenyl-p-phenylenediamine
*[2] N-cyclohexyl-2-benzothiazylsulfenamide
*[3] natural rubber (RSS #3)
*[4] SBR 1500 (made by Sumitomo Chemical Co., Ltd.)

TABLE 3

|  | Example | | | | | | | | | Comparative Example | | | | | | | | |
| --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 | 7 | 8 | 9 |
| Block copolymer | A | B | C | D | E | F | D | E | F | — | G | H | I | J | K | L | K | P |
| Recipe number | 1 | 1 | 1 | 1 | 2 | 2 | 4 | 5 | 5 | 1 | 1 | 1 | 3 | 3 | 4 | 4 | 4 | 5 |
| Rolling resistance index | 99 | 98 | 100 | 96 | 97 | 95 | 91 | 95 | 93 | 100 | 100 | 108 | 106 | 110 | 92 | 90 | 91 | 106 |
| Wet skid index | 105 | 103 | 108 | 104 | 105 | 105 | 102 | 104 | 104 | 100 | 98 | 96 | 97 | 105 | 103 | 101 | 102 | 103 |
| Performance on snow road | 3 | 3 | 3 | 3.5 | 3 | 3 | 4 | 3.5 | 3.5 | 3 | 3 | 3 | 3 | 2 | 3.5 | 3.5 | 3 | 2.5 |
| Steering stability | 3.5 | 3 | 4 | 3 | 3.5 | 3.5 | 3 | 3 | 3.5 | 3 | 3 | 2.5 | 3 | 3 | 2.5 | 2.5 | 2.5 | 2.5 |

As shown in Table 3, the rubber compositions of Examples 1 to 9 according to the present invention are superior in balance between wet skid characteristic, running performance on snow road and steering stability.

In contrast, the rubber composition of Comparative Example 2 wherein the styrene content in the block A is outside the scope of the invention, is poor in running performance on snow road. Also, the rubber compositions of Comparative Examples 3 and 4 wherein the styrene content in the block B is outside the scope of the invention, are poor in wet skid characteristic and running performance on snow road.

Also, the composition of Comparative Example 5 wherein the proportion of the branched polymer is low, is poor in rolling resistance characteristic.

As stated above, according to the present invention, there can be provided a rubber composition suitable as tread rubber of tires of low fuel cost and improved overall in wet skid characteristic, rolling resistance chracteristic, low temperature characteristic amd steering stability as compared with conventional rubber compositions.

In addition to the ingredients used in the Examples, other ingredients can be used in the Examples as set forth in the specification to obtain sustantially the same results.

What we claim is:

1. A rubber composition comprising a rubber component containing a block copolymer, said block copolymer being a branched block copolymer consisting essentially of a block A and a block B, obtained by copolymerization of an aromatic vinyl compound and a conjugated diene compound in the presence of an organolithium initiator in a hydrocarbon solvent and having the following conditions (A) to (E):

(A) the block A is a block of a copolymer wherein the content of the aromatic vinyl compound is from 5 to 20% by weight and the content of 1,2-bonds in the conjugated diene component is from 25 to 55% by weight;

(B) the block B is a block of a copolymer wherein the content of the aromatic vinyl compound is from 35 to 60% by weight and the content of 1,2-bonds in the conjugated diene component is from 20 to 70% by weight;

(C) the content of block A is from 20 to 80% by weight;

(D) the average content of the aromatic vinyl compound is from 20 to 40% by weight and the average content of 1,2-bonds in the conjugated diene component is from 20 to 60% by weight; and (E) at least 40% by weight of the whole polymer chains are modified with at least one coupling agent selected from the group consisting of dimethyl adipate, diethyl adipate and di-n-butyl adipate.

2. The composition of claim 1, wherein the content of the aromatic vinyl compound in the block A is from 10 to 20% by weight.

3. The composition of claim 1, wherein said aromatic vinyl compound is styrene and said conjugated diene compound is 1,3-butadiene.

4. The composition of claim 1, wherein said rubber component is a blend of at least 30% by weight of said block copolymer and at least one member selected from the group consisting of emulsion-polymerized styrene-butadiene, copolymer, a synthetic isoprene rubber, natural rubber and a cis-butadiene rubber.

5. The composition of claim 1, wherein the content of the aromatic vinyl compound in the block B is at least 2 times the average content of the aromatic vinyl compound in the block copolymer.

* * * * *